United States Patent
Yoder et al.

(10) Patent No.: US 10,873,067 B2
(45) Date of Patent: Dec. 22, 2020

(54) FOLDING TAB FOR ULTRA-THIN BATTERY CELL CONNECTION

(71) Applicant: Microsoft Technology Licensing, LLC, Redmond, WA (US)

(72) Inventors: Gregory Yoder, Sammamish, WA (US); Minsoo Kim, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 142 days.

(21) Appl. No.: 16/109,450

(22) Filed: Aug. 22, 2018

(65) Prior Publication Data

US 2020/0067059 A1 Feb. 27, 2020

(51) Int. Cl.
*H01M 2/20* (2006.01)
*H01M 2/10* (2006.01)

(52) U.S. Cl.
CPC ......... *H01M 2/204* (2013.01); *H01M 2/1061* (2013.01)

(58) Field of Classification Search
CPC .......................... H01M 2/204; H01M 2/1061
USPC ....................................................... 429/158
See application file for complete search history.

(56) References Cited

U.S. PATENT DOCUMENTS

| | | | | |
|---|---|---|---|---|
| 2006/0267545 | A1* | 11/2006 | Lee | H01M 2/1061 320/106 |
| 2011/0151730 | A1* | 6/2011 | Kim | H01M 2/22 439/884 |
| 2012/0040223 | A1* | 2/2012 | Odumodu | H01M 2/1077 429/120 |
| 2012/0058371 | A1 | 3/2012 | Carignan | |
| 2014/0205888 | A1* | 7/2014 | Kim | H01M 2/206 429/158 |
| 2015/0064521 | A1 | 3/2015 | Watanabe et al. | |
| 2015/0303415 | A1* | 10/2015 | Kayano | H01M 2/206 429/159 |
| 2018/0233722 | A1* | 8/2018 | Holman | H01M 2/0212 |

FOREIGN PATENT DOCUMENTS

| | | |
|---|---|---|
| JP | S620170149 A | 7/1987 |
| JP | 2014220153 A | 11/2014 |
| KR | 20070049255 A | 5/2007 |

OTHER PUBLICATIONS

"International Search Report and Written Opinion Issued in PCT Application No. PCT/US2019/038797", dated Aug. 21, 2019, 12 Pages.

* cited by examiner

*Primary Examiner* — Sean P Cullen
(74) *Attorney, Agent, or Firm* — Holzer Patel Drennan

(57) ABSTRACT

A multi-cell battery pack includes adjacent thin-film battery cells electrically coupled to one another with a conductive battery cell connection tab. The conductive battery cell connection tab is folded at a deflection point separating a first aperture in a first portion from a second aperture in a second portion. The first aperture and the second aperture are aligned with one another along an axis while the first portion and the second portion are positioned to rest adjacent to opposite surfaces of a first thin-film battery cell. In this position, the first portion and the second portion electrically couple a first thin-film battery cell to a second thin-film battery cell in a same battery cell stack.

20 Claims, 7 Drawing Sheets

Upper Surface

Lower Surface

US 10,873,067 B2

FOLDING TAB FOR ULTRA-THIN BATTERY CELL CONNECTION

BACKGROUND

Ultra-thin battery cells are difficult to electrically couple together due to the fragility of cell components as well as the risk of exacerbating potential reliability issues (e.g., current leakage in lithium-ion batteries). Due to the highly-conductive nature of cell foil tabs used to form electrical connections between stacked cells in these ultra-thin multi-cell battery packs, soldering presents a risk of heat damage to the chemically active battery cell material. Likewise, welding may damage or destroy the cell tab foils.

Since battery cell foil tabs are often conductive on only one of two planar surfaces, coupling mechanisms for thin battery cells often include separate connection points for electrical couplings and mechanical couplings. For example, some current cell coupling solutions utilize conductive tabs that are interleaved between stacked cells, extending outward to a coupling point beyond the perimeter of the individual cells in the stack. Battery packs incorporating these coupling designs are bulky and occupy significant space when incorporated into other electronics.

BRIEF DESCRIPTIONS OF THE DRAWINGS

SUMMARY

A conductive battery cell coupling mechanism is adapted to electrically and mechanically couple together different cells in a multi-cell battery pack. The conductive battery cell connection tab is folded at a deflection point separating a first aperture in a first portion from a second aperture in a second portion. When the first portion and the second portion are positioned to electrically couple a first thin-film battery cell to a second thin-film battery cell, the first portion and the second portion rest adjacent to opposite surfaces of a first thin-film battery cell with the first aperture and the second aperture aligned along an axis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

With the advent of smaller, thinner electronics, flexible thin cell batteries are being integrated into an increasingly large number of personal devices. Due the fragility of ultra-thin battery components and reliability issues known to be associated with lithium-ion batteries, there exist difficulties in electrically and mechanically coupling individual thin-film battery cells together within multi-cell battery packs. The herein disclosed technology provides for a cell coupling solution for ultra-thin battery cells (e.g., thin-film flexible cells) that is both more compact and mechanically robust than other currently-available coupling solutions. As used herein, the term "thin-film battery" or "ultra-thin battery" refers to a type of solid state battery having a thickness on the order of 0.1 mm to 1.00 mm.

Figure 1:
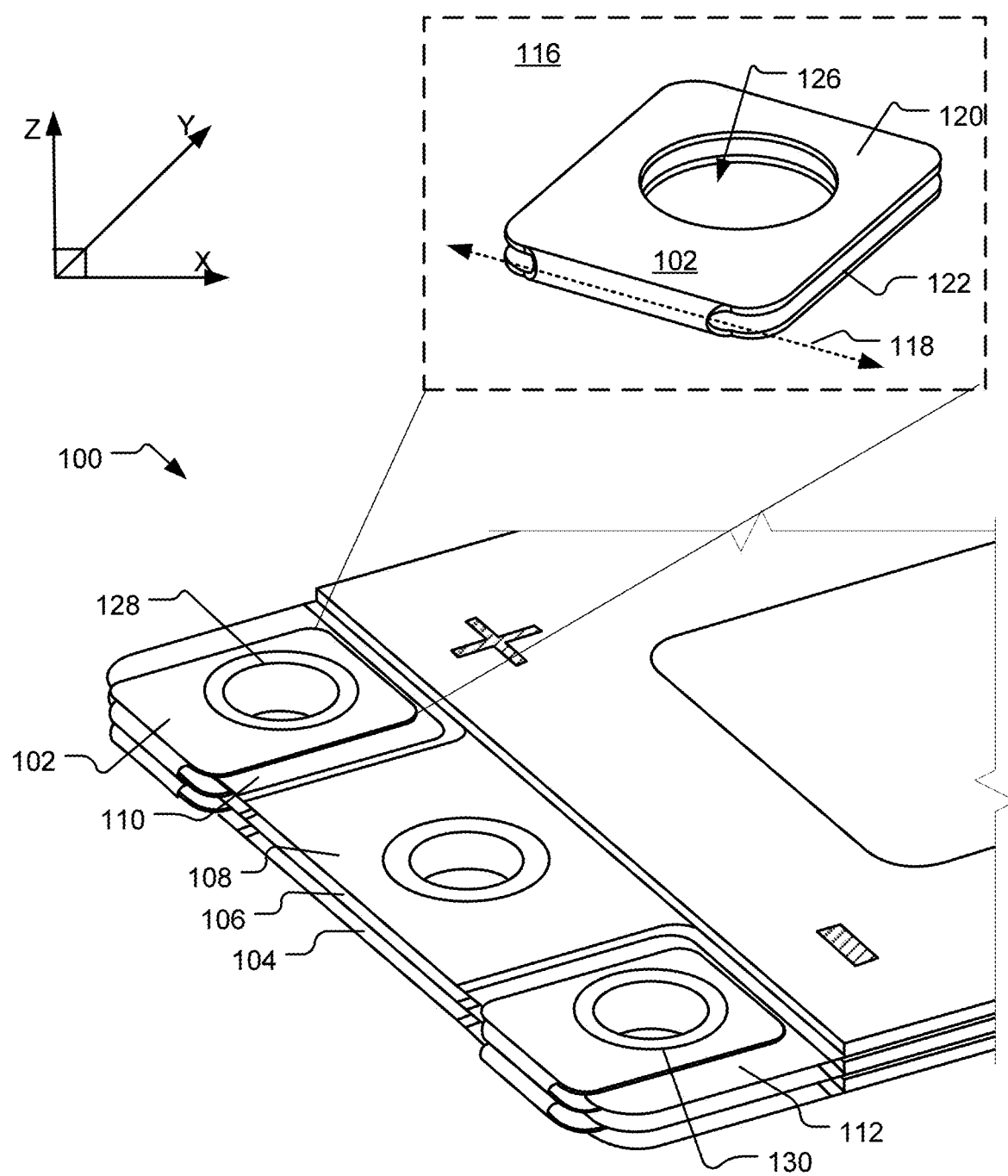
FIG. 1 illustrates an example multi-cell battery pack in which the individual cells are electrically and mechanically coupled together by conductive thin cell connection tabs.

FIG. 1 illustrates an example multi-cell battery pack 100 in which the individual cells are electrically and mechanically coupled together by conductive battery cell connection tabs (e.g., a conductive battery cell connection tab 102). Each one of the conductive battery cell connection tabs supplies an electrical connection between terminals on two adjacent battery cells and also serves as a robust anchor point for mechanically connecting the two adjacent battery cells together.

The example multi-cell battery pack 100 includes a stack of three thin-film battery cells 104, 106, and 108 but may, in other implementations, include two stacked cells or greater than three stacked cells. In different implementations, the cells within the multi-cell battery pack 100 may include identical or disparate physical and/or electrical characteristics. In one implementation, the battery cells within the multi-cell battery pack 100 are ultra-thin lithium-ion polymer battery cells formed on a flexible substrate.

In the illustrated design, each individual battery cell in the multi-cell battery pack 100 includes foil tabs formed in two adjacent corners. For example, the thin-film battery cell 104 includes foil tabs 110 and 112, each of which are electrically coupled to a corresponding electrical terminal of the battery cell 108. In one implementation, the foil tabs 110, 112 are conductive on an upper surface (e.g., the surface visible in FIG. 1), but non-conductive on a lower surface (e.g., a downward-facing surface not visible in FIG. 1).

A magnified view 116 illustrates the conductive battery cell connection tab 102 in greater detail. Although the specific physical and electrical characteristics of the conductive battery cell connection tab 102 may vary from one implementation to another, the conductive battery cell connection tab 102 is shown to be a single continuous component that is conductive throughout and symmetrical about an axis 118. The conductive battery cell connection tab 102 includes two identical apertures 126 that are vertically aligned with one another (e.g., aligned about an axis perpendicular to the plane of each of the thin-film battery cells) when the conductive battery cell connection tab 102 is bent at 180 degrees about the axis 118, as shown. This fold about the axis 118 forms an envelope between an upper portion 120 and a lower portion 122 sized to receive an individual battery cell foil tab (e.g., the foil tab 110). In one implementation, the conductive battery cell connection tab 102 is folded around the foil tab 110 during assembly of the multi-cell battery pack 100, such as in the manner described herein with respect to FIG. 7. In another implementation, the conductive battery cell connection tab 102 is folded prior to integration within the multi-cell battery pack 100.

Each one of the foil tabs 110, 112 includes a central aperture or cut-out that acts as an anchoring point for an attachment mechanism 128 or 130. The central aperture of each of the foil tabs 110, 112 is aligned with the apertures 126 formed in the upper and lower portions (120, 122) of the directly adjacent conductive battery cell connection tab. For example, the foil tab 110 has a central aperture aligned with the apertures 126 formed in the upper portion 120 and the lower portion 122 of the conductive battery cell connection tab 102. Likewise, these apertures 126 are further aligned in the multi-cell battery pack 100 with corresponding apertures in the underlying foil tabs (e.g., foil tabs coupled to the positive terminals in battery cells 104, 106) and conductive battery cell connection tabs enveloping each one of the other cells (104, 106) in the stack.

The aligned apertures of the stacked foil tabs (e.g., the foil tab 110 and the underlying foil tabs) and of the conductive battery cell connection tabs (e.g., the conductive battery cell connection tab 102 and underlying battery cell connection tabs) collectively serve as anchor-point for an attachment mechanism 128 or 130 (also referred to herein as anchoring mechanisms). Although other attachment mechanisms are contemplated, the attachment mechanisms 128, 130 of FIG. 1 are eyelets that have been deformed (e.g., crimped) to fixedly secure together the stack of battery cell connection tabs and thin-film battery cells 104, 106, 108 during an assembly process. In one implementation, the eyelet is inserted through the stack of aligned apertures 126 and a crimping tool is used to radially expand and/or vertically contract the eyelet to fixedly secure together the stack of battery cell connection tabs and thin-film battery cells 104, 106, 108.

Once the conductive thin battery cell connection tabs and thin-film battery cells 104, 106, 108 of the multi-cell battery pack 100 are fixedly secured together (e.g., as shown) by a pair of attachment mechanisms 128, 130, a downward-facing surface of the upper portion 120 of the conductive battery cell connection tab 102 rests adjacent to and in contact with an upward-facing conductive surface of the foil tab 110. A downward-facing surface of the lower portion 122 of the conductive battery cell connection tab 102 rests in contact with an upward-facing surface of the upper portion 120 of an adjacent conductive battery cell tab (e.g., as shown in FIG. 4B). In this manner, the conductive battery cell connection tab 102 acts as an electrical pathway to the adjacent conductive battery cell connection tab that is wrapped around the adjacent thin-film battery cell 106.

As used herein, the terms "downward-facing" and "upward-facing" are generally used to describe the orientations of different surfaces relative to one another rather than to particular direction within a given coordinate system. The orientation of the battery pack at any given time does preclude the applicability of either term. For example, two surfaces that face in the same direction may be referred to herein as either both being "downward-facing" or both being "upward-facing." In FIG. 1, "downward-facing" refers to the negative Z-direction and "upward-facing" refers to the positive Z-direction."

Figure 2A:
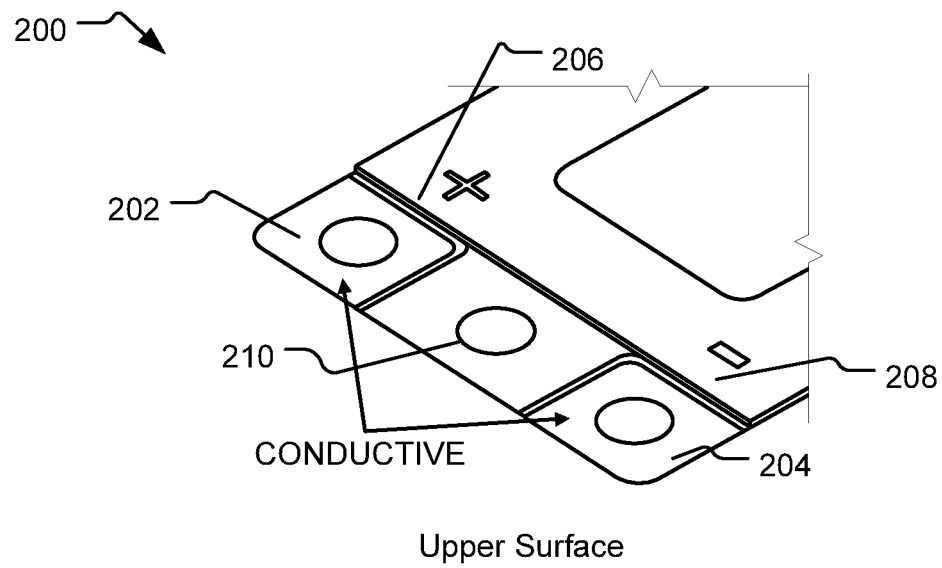
FIG. 2A illustrates an upper surface of an example ultra-thin battery cell that may be coupled to other ultra-thin battery cells via the coupling techniques disclosed herein.
Figure 2B:
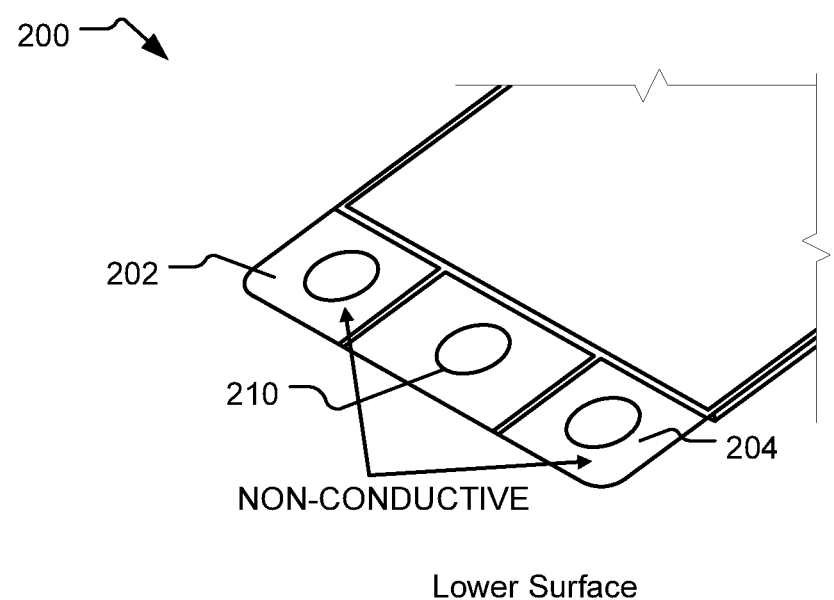
FIG. 2B illustrates a lower surface of the example ultra-thin battery cell of FIG. 2A.

FIG. 2A illustrates an upper surface of an example ultra-thin battery cell 200 that may be coupled to other ultra-thin battery cells via the coupling techniques disclosed herein. FIG. 2B illustrates a lower surface of the example ultra-thin battery cell 200. Corner regions 202, 204, are formed of a thin foil material that is electrically coupled to an adjacent electrical terminal of the battery cell (e.g., a positive terminal 206 or a negative terminal 208). In the illustrated implementation, the foil material of the corner regions 202, 204 is conductive on the upper surface (visible in FIG. 2A) but non-conductive on the lower surface (visible in FIG. 2B). Once the ultra-thin battery cell 200 is integrated within a multi-cell battery pack (e.g., the multi-cell battery pack 100 of FIG. 1), the opposing pair of conductive and non-conductive surfaces for each battery cell rests adjacent to upper and lower planar portions, respectively, of a conductive battery cell connection tab such as the conductive battery cell connection tab 102 shown in FIG. 1.

In addition to the apertures in the corner regions 202 and 204, the ultra-thin battery cell 200 includes a third aperture 210 in a central region. In one implementation, this aperture serves as an anchor point for electrically coupling together multiple layers that are included within the ultra-thin battery cell 200. For example, the ultra-thin battery cell 200 may include an upper layer coated with active material and a lower layer coated with conductive material to serve as the positive terminal. Placing a conductive eyelet or other anchoring mechanism through this third aperture 210 may therefore facilitate electrical flows between multiple layers internal to the ultra-thin battery cell 200.

Figure 3A:
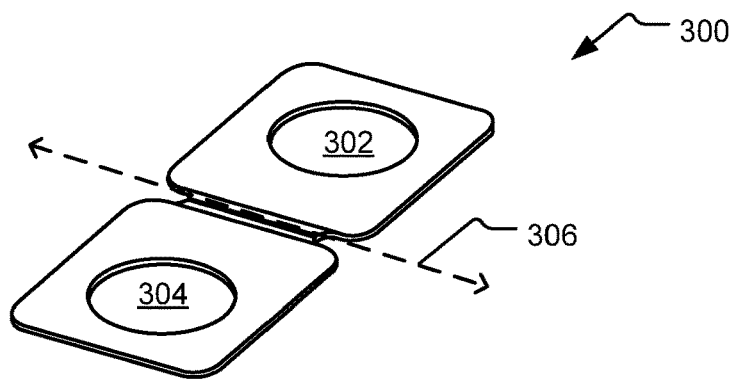
FIG. 3A illustrates a first perspective view of a connection tab in an unfolded position.
Figure 3B:
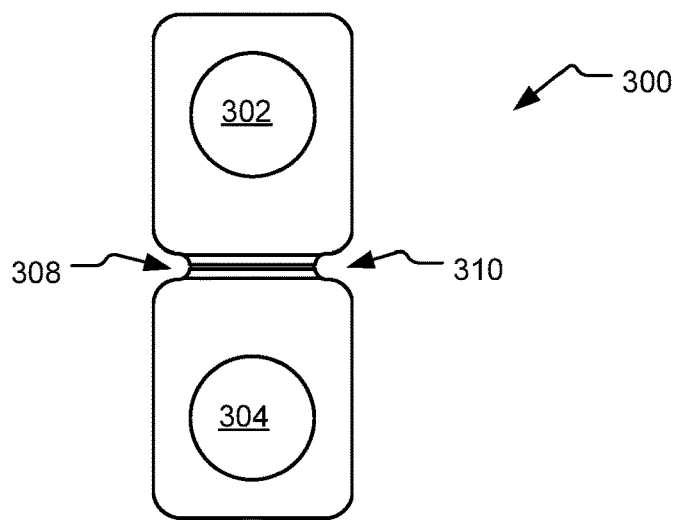
FIG. 3B illustrates a top-down view of the connection tab of FIG. 3A.
Figure 3C:
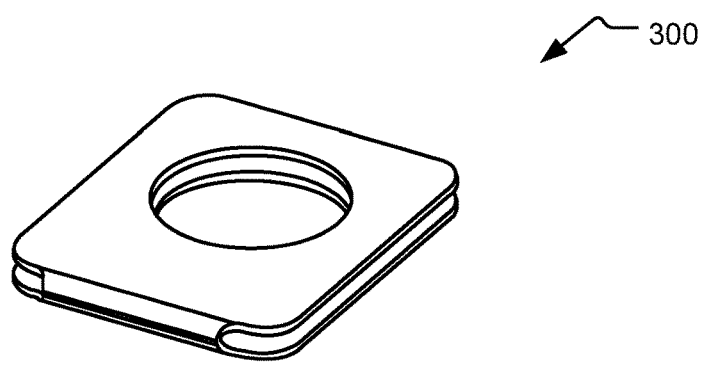
FIG. 3C illustrates a perspective view of the connection tab of FIG. 3A-3B after the connection tab is folded 180 degrees about a midpoint axis.

FIGS. 3A-3C illustrate different views of an example conductive battery cell connection tab, hereinafter referred to as "connection tab 300." FIG. 3A illustrates a first perspective view of the connection tab 300 in an unfolded position. The connection tab 300 is generally rectangular in shape and includes two identical apertures 302, 304 spaced symmetrically about a midpoint axis 306, which intersects mid-points on opposite sides of the connection tab 300. The positions and sizes of the apertures 302, 304 may vary in different implementations based on characteristics of ultra-thin battery cell(s) that the connection tab 300 is designed to couple together.

In FIG. 3B, the connection tab 300 is shown to include opposing notches 308 and 310 ("mouse bites") formed along the midpoint axis 306. These notches 308 and 310 serve to facilitate targeted bending along the midpoint axis 306 of the connection tab about the midpoint axis 306. In some implementations, the connection tab 300 may include etchings, markings, additional cutouts, or other features in the region proximal to and/or intersecting the midpoint axis 306 to facilitate targeting bending along this axis and reduced variability in the location of this bend between otherwise identical components.

FIG. 3B illustrates a top-down view of the connection tab 300 in the unfolded position. In one implementation, the connection tab 300 is folded during assembly of a multi-cell battery pack (not shown).

FIG. 3C illustrates a perspective view of the connection tab 300 after the connection tab is folded 180 degrees about the midpoint axis 306. In one implementation, the connection tab 300 is folded around the edge of an ultra-thin battery cell (not shown) during assembly of a multi-cell battery pack (not shown). The connection tab 300 may be formed from one or more of a variety of conductive materials including without limitation nickel, stainless steel, and copper. Flexible materials, such as nickel, may simplify assembly of the multi-cell battery pack.

Figure 4A:
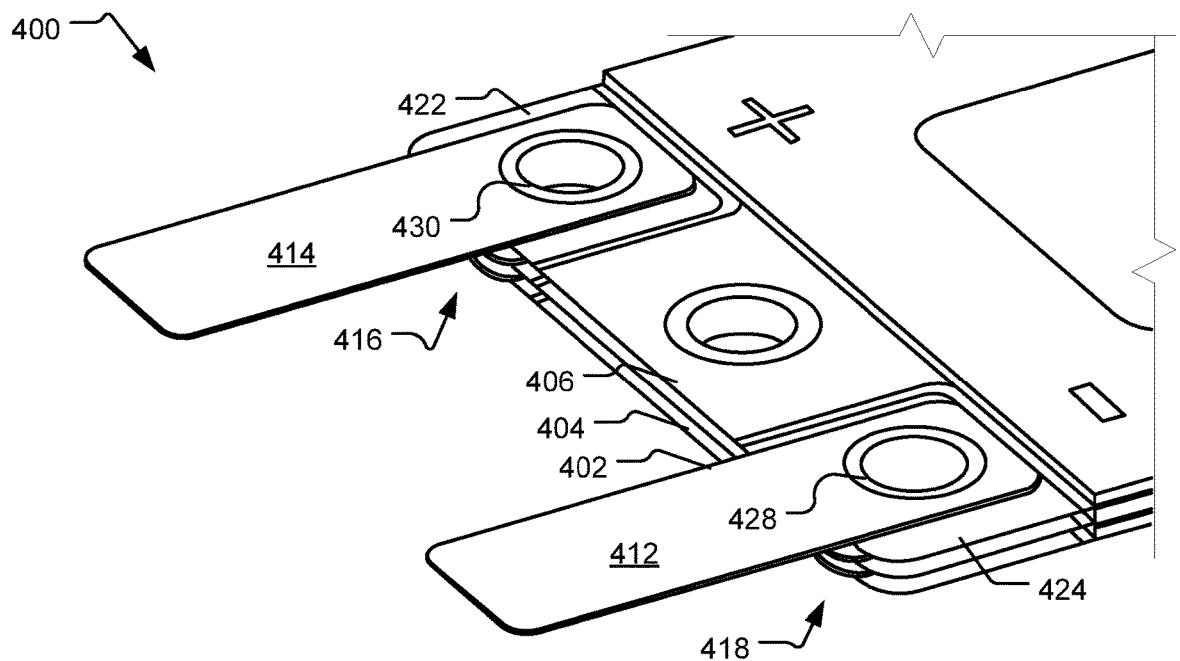
FIG. 4A illustrates a perspective view of an example multi-cell battery pack including three thin-film battery cells coupled together by two stacks of exemplary conductive battery cell connection tabs.
Figure 4B:
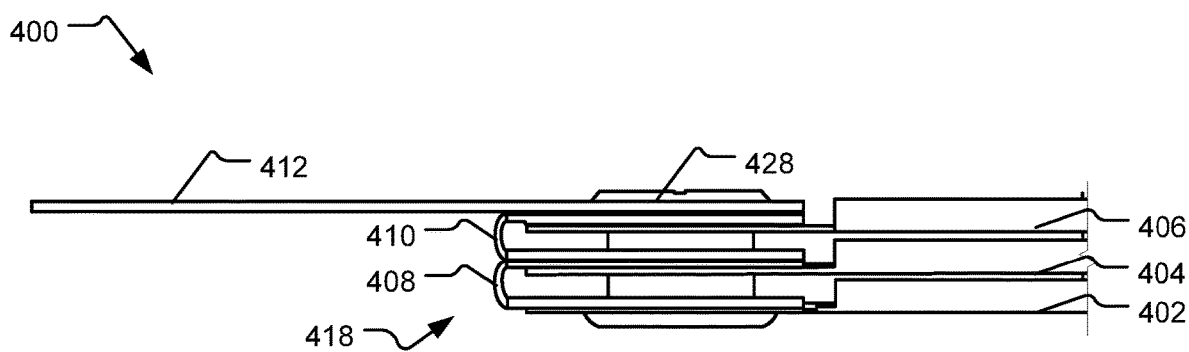
FIG. 4B illustrates a side view of the multi-cell battery pack of FIG. 4A.

FIG. 4A illustrates a perspective view of an example multi-cell battery pack 400 including three ultra-thin-film battery cells 402, 404, and 406 coupled together by two stacks 416, 418 of exemplary conductive battery cell connection tabs. FIG. 4B illustrates a side view of the multi-cell battery pack 400 that illustrates the stack 418 of conductive battery cell connection tabs in greater detail.

Specifically, the stack 418 includes three stacked conductive connection tabs 408, 410, and 412. The conductive connection tabs 408 and 410 each provide an electrical connection between terminals of two adjacent battery cells (e.g., between 402 and 404 or between 404 and 406).

While each of the conductive connection tabs 408 and 410 includes two aligned apertures that couple to an anchoring mechanism 428, the top-most conductive connection tabs 412 and 414 each include a single aperture that couples to an anchoring mechanism 428 or 430. These top-most conductive connection tabs 412 and 414 may be trimmed, bent, folded or otherwise manipulated for electrical attachment to the surrounding system depending on a desired connection design.

Corner regions 422, 424 (visible in FIG. 4A but not FIG. 4B) of each of the battery cells 402, 404, and 406 are formed of a thin foil material that is electrically coupled to one of the battery cell terminals. For example, the corner region 422 in the battery cell 406 electrically couples to the positive terminal of the cell while the corner region 424 electrically couples to the negative terminal of the cell.

In the illustrated implementation, the foil material of the corner regions 422, 424 is conductive on the upper surface but non-conductive on the lower surface. Each of the conductive connection tabs 408 and 410 electrically couples an upward-facing conductive surface of one of the corner regions 422 or 424 to an upward-facing conductive surface of a corresponding corner region in the immediately adjacent battery cell.

Figure 5:
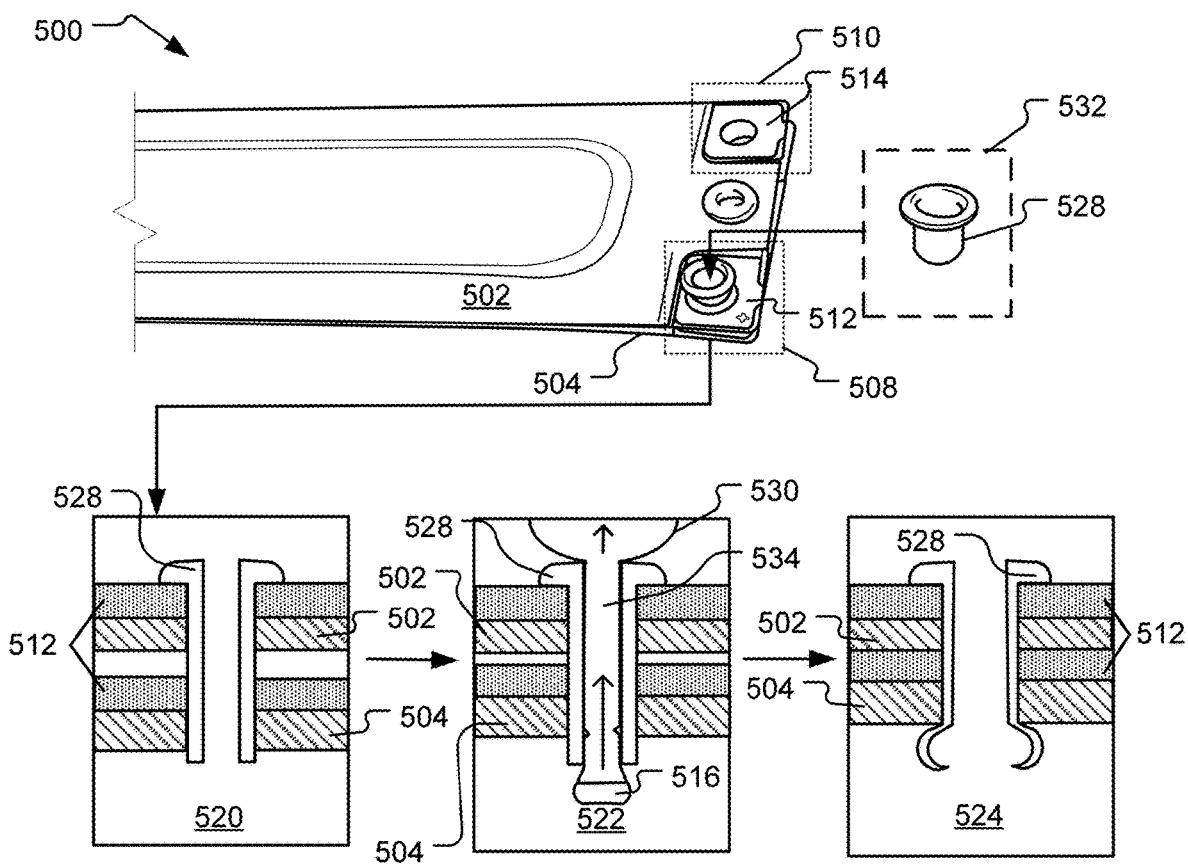
FIG. 5 illustrates an example ultra-thin multi-cell battery pack being assembled during a manufacturing process.

In FIG. 4A, each stack 416 and 418 of connection tabs is anchored together by the anchoring mechanism 428 or 430 (e.g., an eyelet) that is threaded through the stack of connection tabs and thin-film battery cells. For example, the anchoring mechanism 428 is threaded through apertures of the upper and lower portions of each of the conductive connection tabs 408 and 410 and also through an aperture formed in the top-most connection tab 412 and apertures in the corner region 424 of each of the battery cells 402, 404, 406. In different implementations, the anchoring mechanisms 428 and 430 may assume a variety of different forms and be secured within the multi-cell battery pack 400 in different ways. FIG. 5 herein and the associated description provide a further description of one example anchoring mechanism suitable for securing the stacks of battery cells 402, 404, 406 and the conductive connection tabs (e.g., 410, 412) relative to one another.

FIG. 5 illustrates an example multi-cell battery pack 500 being assembled during a manufacturing process. The multi-cell battery pack 500 includes two cells (an upper cell 502 and a lower cell 504), each of which may individually include one or more thin-film layers that serve different functions.

In FIG. 5, a first conductive connection tab 512 is shown folded with upper and lower portions encompassing a corner region 508 of both the upper cell 502 and the lower cell 504. A second conductive connection tab 514 is shown folded with upper and lower portions encompassing the corner region 510 of both the upper cell 502 and the lower cell 504. Specific features of the first conductive connection tab 512 and the second conductive connection tab 514 not explicitly described may be the same or similar to those described with respect to other implementations.

During the illustrated assembly process, the upper cell 502 and lower cell 504 are secured together by an anchoring mechanism 528. As visible in process steps illustrated by views 520, 522, and 524, the first conductive connection tab 512 is wrapped around the upper cell 502 such that the lower portion of the first conductive connection tab 512 rests in contact with an upward-facing surface of the foil in the corner region 508 of the lower cell 504 and the portion of the first conductive connection tab 512 rests in contact with an upward-facing surface of the foil in the corner region 508 of the upper cell 502. Although not shown, the second conductive connection tab 514 may be similarly positioned relative to the corner region 510 of both the upper cell 502 and the lower cell 504.

During an anchor positioning step illustrated in the view 520, the anchoring mechanism 528 (shown in isolation in view 532) is inserted sequentially through aligned apertures of the upper portion of the first conductive connection tab 512, the upper cell 502, the lower cell 504, and the lower portion of the first conductive connection tab 512.

During an example anchor securement step illustrated in the view 522, a crimping tool 530 applies an upward force on an elongated shank 534. The elongated shank 534 includes a wide diameter portion 516 that transfers the applied force to a bottom perimeter of the anchoring mechanism 528. This causes the bottom of the anchoring mechanism 528 to bend radially outward, effectively contracting the length of the anchoring mechanism 528 and pushing together the upper cell 502 and the lower cell 504.

The view 524 illustrates the anchoring mechanism 528 after it has been secured by the crimping tool 530 (shown in view 522). The first conductive connection tab 512 robustly couples the upper cell 502 to the lower cell 504 while supplying the electrical connections between cells by contacting a conductive surface on each cell. This design accomplishes the foregoing without utilizing bulky components that increase volume of the multi-cell battery pack 500.

Figure 6:
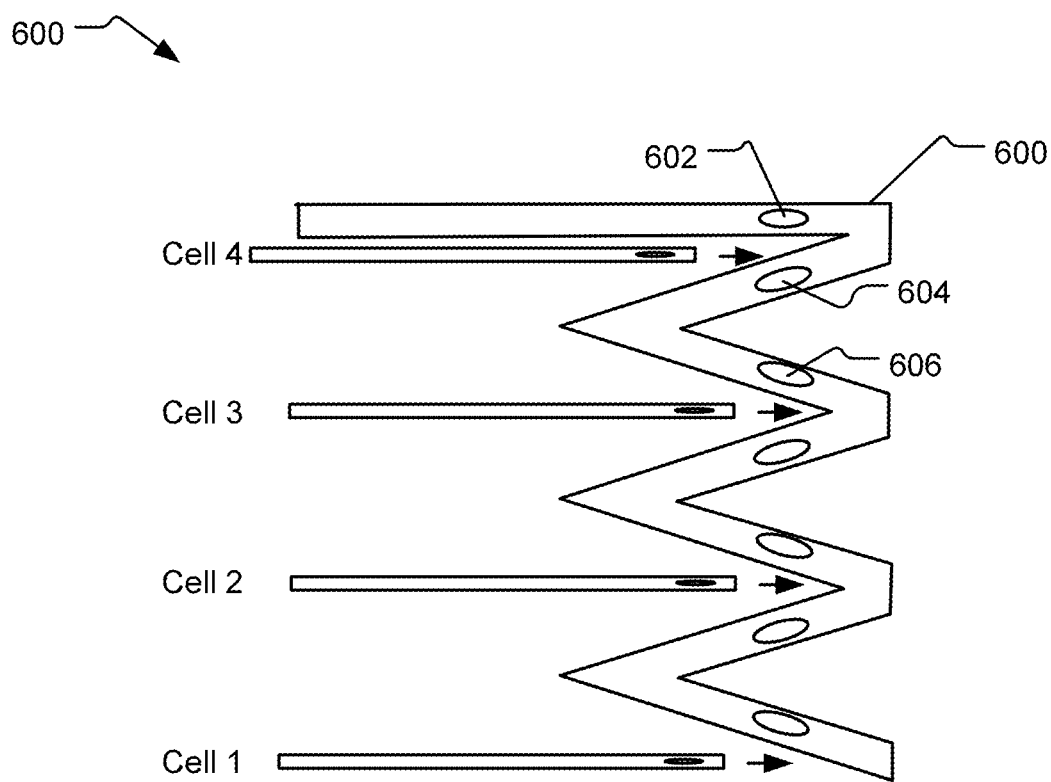
FIG. 6 illustrates a perspective view of another example conductive battery cell connection tab.

FIG. 6 illustrates a perspective view of another example conductive battery cell connection tab 600. Unlike the conductive battery cell connection tabs described and illustrated with respect to FIGS. 1, 3A-3C, and 4A-4B, the conductive battery cell connection tab 600 is a single-piece component designed to electrically couple together more than two thin-film battery cells. The conductive battery cell connection tab 600 includes an accordion-like structure with several folds. Each fold separates two adjacent segments, and each one of the adjacent segments includes an aperture (e.g., apertures 602, 604, 606) sized and positioned for alignment with a corresponding aperture formed in a conductive foil tab of a battery cell.

In the illustrated implementation, the conductive battery cell connection tab 600 is configured to supply electrical couplings between four different ultra-thin battery cells (cell 1, cell 2, cell 3, and cell 4). The accordion-like structure of the conductive battery cell connection tab 600 may, in different implementations, be of variable length and folded to include a fewer or greater number of individual segments to accommodate couplings between fewer or greater than four battery cells. As in other implementations disclosed herein, the conductive battery cell connection tab 600 may be fixedly secured to the battery cells (cells 1-4) by inserting and securing an anchoring mechanism (not shown) within the aligned series of apertures, such as in the manner shown and described with respect to FIG. 5.

Figure 7:
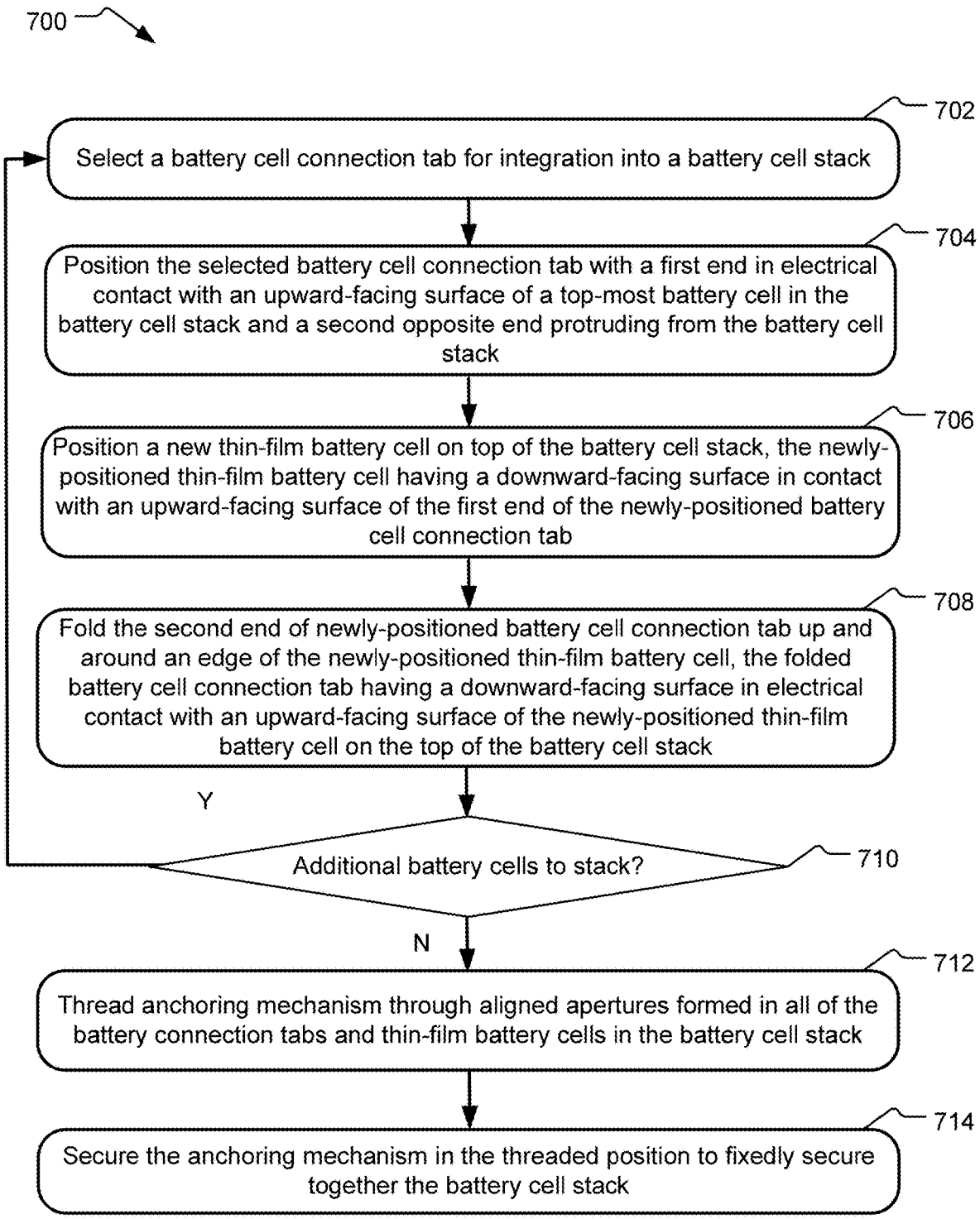
FIG. 7 illustrates example operations for assembling a ultra-thin multi-cell battery pack using a plurality of conductive connection tabs.

FIG. 7 illustrates example operations 700 for assembling a ultra-thin multi-cell battery pack using a plurality of conductive connection tabs. A selection operation 702 selects a battery cell connection tab for integration into a battery cell stack. In one implementation, the battery cell connection tab is a conductive component including characteristics the same or similar to those described with respect to FIGS. 1, 3A-3C, and 4A-4B.

A first positioning operation 704 positions the selected battery cell connection tab to have a first end in electrical contact with an upward-facing surface of a top-most battery cell in the battery cell stack and a second opposite end protruding from a perimeter of the battery cell stack (e.g., such that the second end does not overlap any underlying cells within the battery cell stack). The first positioning operation 704 may be performed multiple times during the formation of the multi-cell battery pack to position a different conductive battery cell connection tab between each adjacent pair of battery cells. Consequently, the term "newly-positioned battery cell connection tab" is used in the following description to refer to the battery cell connection tab that was positioned in the most recent instance of the positioning operation 704.

Another positioning operation 706 positions a new thin-film battery cell on top of the battery cell stack with a downward-facing surface in contact with an upward-facing surface of the first end of the newly-positioned battery cell connection tab. Throughout formation of the multi-cell battery back, the positioning operation 706 may also be performed multiple times. Accordingly, the term "newly-positioned thin-film battery cell" is used in the following description to refer to the thin-film battery cell that was positioned in the most recent instance of the positioning operation 706.

Following the positioning operation 706, a folding operation 708 folds the second end of the newly-positioned battery cell connection tab up and around an edge of the newly-positioned thin-film battery cell. This folding places a downward-facing surface of the newly-positioned battery cell connection tab in electrical contact with an upward-facing surface of the newly-positioned thin-film battery cell on the top of the battery cell stack.

A determination operation 710 determines whether there exist additional thin-film battery cells to incorporate into the battery cell stack. If there does exist additional thin-film battery cells to incorporate into the stack, the operations 702, 704, 706, and 708 are repeated. In effect, these operations provide for placement of a new battery cell connection tab on top of the stack, placement of a new thin-film battery cell on the newly-positioned battery cell connection tab, and folding the newly-positioned battery cell connection tab up and over the newly-positioned thin-film battery cell, such as in a manner the same or similar to that depicted in FIGS. 4A and 4B. This process is repeated until there are no additional thin-film battery cells to incorporate into the stack.

Once each of the thin-film battery cells is incorporated into the stack, an anchoring operation 712 threads an anchoring mechanism (e.g., an eyelet, rivet, or other fastener) through aligned apertures in each layer of the multi-cell stack. The anchoring mechanism extends through each one of the battery cell connection tabs and each thin-film battery cell of the battery cell stack. An anchor securement operation 714 locks the anchoring mechanism in the threaded position, fixedly positioning together the battery cell connection tabs and thin-film battery cells in the positions described above with respect to the positioning operations 704, 706, and the folding operation 708.

An example apparatus disclosed herein includes a conductive battery cell connection tab folded at a deflection point separating a first aperture in a first portion from a second aperture in a second portion. The first portion and the second portion electrically couple a first thin-film battery cell to a second thin-film battery cell when the first portion and the second portion rest adjacent to opposite surfaces of a first thin-film battery cell with the first aperture and the second aperture aligned along an axis.

In another example apparatus according to any preceding apparatus, the conductive battery cell connection tab is symmetrical about a deflection point.

In still another example apparatus of any preceding apparatus,
the first portion includes a first end of the conductive battery cell connection tab and the second portion includes a second opposite end of the conductive battery cell connection tab.

In yet another example apparatus of any preceding apparatus, the conductive battery cell connection tab has an accordion-like shape including at least two folds, each of the at least two folds defining a boundary between two of multiple conductive portions. Each one of the multiple conductive portions further includes an aperture that is aligned along an axis with an aperture formed in each other one of the multiple conductive portions.

In yet another example apparatus of any preceding apparatus, the conductive battery cell connection tab is folded along an axis extending between first and second notches formed in opposite edges of the conductive battery cell connection tab.

In still another example apparatus of any preceding apparatus, a first surface of the conductive battery cell connection tab electrically couples with an upward-facing surface of the first thin-film battery cell and a second opposite surface of the conductive battery cell connection tab electrically couples with an upward-facing surface of the second thin-film battery cell.

An example battery pack disclosed herein includes a stack of thin-film battery cells including at least a first thin-film battery cell and a second thin-film battery cell arranged in two overlapping parallel planes. The stack further includes a first conductive battery cell connection tab folded to double-back on itself between a first portion and a second portion, the first portion forming a first electrical connection with the first thin-film battery cell and the second portion forming a second electrical connection with the second thin-film battery cell.

In another example battery pack according to any preceding battery pack, the first portion of the first conductive battery cell connection tab forms the first electrical connection with an upward-facing surface of the first thin-film battery cell and the second portion of the first conductive battery cell connection tab forms the second electrical connection with an upward-facing surface of the second thin-film battery cell.

In still another example battery pack according to any preceding battery pack, the first electrical connection and the second electrical connection are formed on opposing surfaces of the first conductive battery cell connection tab.

In yet still another example battery pack according to any preceding battery pack, the first conductive battery cell connection tab is folded at a mid-point and includes a first aperture and a second aperture on opposite sides of the mid-point. The first aperture and the second aperture are aligned along an axis perpendicular to the two overlapping parallel planes.

Still another example battery pack of any preceding battery pack includes an anchoring mechanism extending through the first aperture and the second aperture of the first conductive battery cell connection tab and also extending through a third aperture formed in the first thin-film battery cell. The anchoring mechanism secures the first thin-film battery cell, the second thin-film battery cell, and the first conductive battery cell connection tab in fixed positions relative to one another.

In yet still another example battery pack of any preceding battery pack, the first conductive battery cell connection tab electrically connects a first electrical lead on an upward-facing surface of the first thin-film battery cell to a first electrical lead on an upward-facing surface of the second thin-film battery cell. Additionally, the battery pack further comprises a second conductive battery cell tab that electrically connects a second electrical lead on an upward-facing surface of the first thin-film battery cell to a second electrical lead on an upward-facing surface of the second thin-film battery cell.

In still another battery pack of any preceding battery pack, the first conductive battery cell connection tab is folded along an axis extending between first and second notches formed in opposite edges of the first conductive battery cell connection tab.

In yet still another example battery pack of any preceding battery pack, the stack of thin-film battery cells further includes a third thin-film battery cell on top of the second thin-film battery cell; and an additional conductive battery cell connection tab positioned with a portion interleaved between the second thin-film battery cell and the third thin-film battery cell. The additional conductive battery cell connection tab has another portion folded up and around an end of the third thin-film battery cell to electrically couple the second thin-film battery cell and the third thin-film battery cell.

An example method of assembling a multi-cell battery pack includes positioning a first conductive battery cell connection tab on a battery cell stack such that the first conductive battery cell connection tab has a first portion in electrical contact with an upward-facing surface of a first thin-film battery cell and a second portion protruding from a perimeter of the battery cell stack. The method further includes stacking a second thin-film battery cell on top of the first thin-film battery cell such that a downward-facing surface of the second thin-film battery cell contacts the first portion of the first conductive battery cell connection tab, and folding the second portion of the first conductive battery cell connection tab up and around an end of the second thin-film battery cell such that the first battery cell connection tab has a downward-facing surface in electrical contact with an upward-facing surface of the second thin-film battery cell. The method further includes mechanically securing the first thin-film battery cell into a fixed position relative to the second thin-film battery cell.

In an example method of any preceding method, mechanically securing the first thin-film battery cell relative to the second thin-film battery cell further comprises threading an anchoring mechanism through the first thin-film battery cell, the second thin-film battery cell, and through at least two apertures formed in the first conductive battery cell connection tab.

In yet another example method of any preceding method, the first conductive battery cell includes a first aperture and a second aperture on opposite sides of a midpoint. In this method, folding the first conductive battery cell connection tab further comprises folding the first conductive battery cell connection tab at the midpoint to align the first aperture and the second aperture along an axis perpendicular to the first thin-film battery cell and the second thin-film battery cell.

In still another example method of any preceding method, folding the first conductive battery cell connection tab further comprises folding the first conductive battery cell connection tab along an axis extending between first and second notches formed in opposite edges of the first conductive battery cell connection tab.

In another example method of any preceding method, the first portion of the conductive battery cell connection tab includes a first end and the second portion of the conductive battery cell connection tab includes a second opposite end.

In yet still another example method of any preceding method, the method further includes positioning a second conductive battery cell connection tab on top of the battery cell stack and in electrical contact with an upward-facing surface of the first conductive battery cell connection tab.

An example system disclosed herein includes a means for positioning a first conductive battery cell connection tab on a battery cell stack such that the first conductive battery cell connection tab has a first portion in electrical contact with an upward-facing surface of a first thin-film battery cell and a second portion protruding from a perimeter of the battery cell stack. The system further comprises a means for stacking a second thin-film battery cell on top of the first thin-film battery cell such that a downward-facing surface of the second thin-film battery cell contacts the first portion of the first conductive battery cell connection tab, and a means for folding the second portion of the first conductive battery cell connection tab up and around an end of the second thin-film battery cell such that the first battery cell connection tab has a downward-facing surface in electrical contact with an upward-facing surface of the second thin-film battery cell. The system also includes a means for mechanically securing the first thin-film battery cell into a fixed position relative to the second thin-film battery cell.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A battery pack comprising:
a stack of thin-film battery cells including at least a first thin-film battery cell and a second thin-film battery cell arranged in two overlapping parallel planes; and
a first conductive battery cell connection tab folded at a mid-point to double-back on itself between a first portion and a second portion, the first portion being attached to the stack of thin-film battery cells at a position above an upward-facing surface of the first thin-film battery cell and electrically connecting to the first thin-film battery cell, the second portion being attached to the stack of thin-film battery cells at a position above an upward-facing surface of the second thin-film battery cell and electrically connecting to the second thin-film battery cell.

2. The battery pack of claim 1, wherein the electrical connection to the first thin-film battery cell and the electrical connection to the second thin-film battery cell are formed on opposing surfaces of the first conductive battery cell connection tab.

3. The battery pack of claim 1, wherein the first conductive battery cell connection tab is folded along an axis extending between first and second notches formed in opposite edges of the first conductive battery cell connection tab.

4. The battery pack of claim 1, wherein the first conductive battery cell connection tab electrically connects a first electrical lead on the upward-facing surface of the first thin-film battery cell to a first electrical lead on the upward-facing surface of the second thin-film battery cell, and wherein the battery pack further comprises:
  a second conductive battery cell tab that electrically connects a second electrical lead on the upward-facing surface of the first thin-film battery cell to a first electrical lead on an upward-facing surface of a third thin-film battery cell.

5. The battery pack of claim 1, wherein the stack of thin-film battery cells further includes:
  a third thin-film battery cell on top of the second thin-film battery cell; and
  an additional conductive battery cell connection tab positioned with a portion interleaved between the second thin-film battery cell and the third thin-film battery cell, the additional conductive battery cell connection tab having another portion folded up and around an end of the third thin-film battery cell to electrically couple the second thin-film battery cell and the third thin-film battery cell.

6. The battery pack of claim 1, wherein the first conductive battery cell connection tab includes a first aperture and a second aperture on opposite sides of the mid-point, the first aperture and the second aperture being aligned along an axis perpendicular to the two overlapping parallel planes.

7. The battery pack of claim 6, further comprising:
  an anchoring mechanism extending through the first aperture and the second aperture of the first conductive battery cell connection tab and also extending through a third aperture formed in the first thin-film battery cell, the anchoring mechanism securing the first thin-film battery cell, the second thin-film battery cell, and the first conductive battery cell connection tab in fixed positions relative to one another.

8. A method comprising:
  forming a stack of thin-film battery cells including at least a first thin-film battery cell and a second thin-film battery cell arranged in two overlapping parallel planes; and
  folding a first conductive battery cell connection tab at a midpoint to double-back on itself between a first portion and a second portion, the first portion being attached to the stack of thin-film battery cells at a position above an upward-facing surface of the first thin-film battery cell and electrically connecting to the first thin-film battery cell, the second portion being attached to the stack of thin-film battery cells at a position above an upward-facing surface of the second thin-film battery cell and electrically connecting to the second thin-film battery cell.

9. The method of claim 8, wherein the electrical connection to the first thin-film battery cell and the electrical connection to the second thin-film battery cell are formed on opposing surfaces of the first conductive battery cell connection tab.

10. The method of claim 8, wherein the first conductive battery cell connection tab is folded along an axis extending between first and second notches formed in opposite edges of the first conductive battery cell connection tab.

11. The method of claim 8, wherein the method further includes:
  positioning a third thin-film battery cell on top of the second thin-film battery cell; and
  positioning an additional conductive battery cell connection tab with a portion interleaved between the second thin-film battery cell and the third thin-film battery cell, the additional conductive battery cell connection tab having another portion folded up and around an end of the third thin-film battery cell to electrically couple the second thin-film battery cell and the third thin-film battery cell.

12. The method of claim 8, wherein the first conductive battery cell connection tab electrically connects a first electrical lead on the upward-facing surface of the first thin-film battery cell to a first electrical lead on the upward-facing surface of the second thin-film battery cell, and wherein the method further comprises:
  connecting a second conductive battery cell tab to a second electrical lead on the upward-facing surface of the first thin-film battery cell and to a first electrical lead on an upward-facing surface of a third thin-film battery cell.

13. The method of claim 8,
  wherein the first conductive battery cell connection tab includes a first aperture and a second aperture on opposite sides of the mid-point, the first aperture and the second aperture being aligned along an axis perpendicular to the two overlapping parallel planes.

14. The method of claim 13, further comprising:
  extending an anchoring mechanism through the first aperture and the second aperture of the first conductive battery cell connection tab and also extending the anchoring mechanism through a third aperture formed in the first thin-film battery cell, the anchoring mechanism securing the first thin-film battery cell, the second thin-film battery cell, and the first conductive battery cell connection tab in fixed positions relative to one another.

15. A method of assembling a multi-cell battery pack comprising:
  positioning a first conductive battery cell connection tab on a battery cell stack,
  wherein the battery cell stack includes at least a first thin-film battery cell and a second thin-film battery cell, the first conductive battery cell connection tab having a first portion and a second portion, the first portion being attached to the battery cell stack at a position above an upward-facing surface of the first thin-film battery cell and electrically connecting to the first thin-film battery cell and the second portion protruding from a perimeter of the battery cell stack;
  stacking the second thin-film battery cell on top of the first thin-film battery cell such that a downward-facing surface of the second thin-film battery cell contacts the first portion of the first conductive battery cell connection tab;

folding the second portion of the first conductive battery cell connection tab at a midpoint between the first portion and the second portion so as to fold the second portion up and around an end of the second thin-film battery cell, the first battery cell connection tab having a downward-facing surface attached to the battery cell stack at a position above an upward-facing surface of the second thin-film battery cell and electrically connecting to the second thin-film battery cell; and securing the first thin-film battery cell into a fixed position relative to the second thin-film battery cell.

16. The method of claim 15,
wherein the first portion of the first conductive battery cell connection tab includes a first end and the second portion of the first conductive battery cell connection tab includes a second opposite end.

17. The method of claim 15, wherein securing the first thin-film battery cell relative to the second thin-film battery cell further comprises:
threading an anchoring mechanism through the first thin-film battery cell, the second thin-film battery cell, and through at least two apertures formed in the first conductive battery cell connection tab.

18. The method of claim 15, wherein folding the first conductive battery cell connection tab further comprises:
folding the first conductive battery cell connection tab along an axis extending between first and second notches formed in opposite edges of the first conductive battery cell connection tab.

19. The method of claim 15, wherein the first conductive battery cell
includes a first aperture and a second aperture on opposite sides of the midpoint and folding the first conductive battery cell connection tab further comprises:
folding the first conductive battery cell connection tab at the midpoint to align the first aperture and the second aperture along an axis perpendicular to the first thin-film battery cell and the second thin-film battery cell.

20. The method of claim 15, further comprising:
positioning a second conductive battery cell connection tab on top of the battery cell stack and in electrical contact with an upward-facing surface of the first conductive battery cell connection tab;
stacking a third thin-film battery cell on top of the battery cell stack and with a downward-facing surface in contact with the first portion of the second conductive battery cell connection tab; and
folding the second conductive battery cell connection tab up and around an end of the third thin-film battery cell to establish electrical contact between the second thin-film battery cell and the third thin-film battery cell.

* * * * *